(12) United States Patent
Ghanem et al.

(10) Patent No.: US 8,248,271 B2
(45) Date of Patent: Aug. 21, 2012

(54) TRAFFIC LED LAMP WITH INTERNAL CIRCUIT BACKUP SYSTEM

(75) Inventors: Mohamed Cherif Ghanem, Lachine (CA); John Chrisman, Valley View, OH (US); Benoit Essiambre, Lachine (CA); Christian Poirier, Lachine (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 449 days.

(21) Appl. No.: 12/542,208

(22) Filed: Aug. 17, 2009

(65) Prior Publication Data

US 2010/0039794 A1 Feb. 18, 2010

Related U.S. Application Data

(60) Provisional application No. 61/089,072, filed on Aug. 15, 2008.

(51) Int. Cl.
 G08G 1/095 (2006.01)
 H05B 37/02 (2006.01)
(52) U.S. Cl. ........ 340/907; 340/909; 340/912; 340/916; 363/12; 363/80; 315/159; 315/160; 315/291
(58) Field of Classification Search .................. 340/907, 340/909, 912, 916, 478, 636.12, 309.16; 363/12, 80, 89; 315/159, 160, 175, 291
See application file for complete search history.

(56) References Cited

U.S. PATENT DOCUMENTS

| | | | | |
|---|---|---|---|---|
| 5,208,584 | A | * | 5/1993 | Kaye et al. .................... 340/907 |
| 5,661,645 | A | | 8/1997 | Hochstein |
| 6,268,805 | B1 | * | 7/2001 | Simon ........................... 340/907 |
| 2002/0027510 | A1 | * | 3/2002 | Jones et al. ................... 340/907 |
| 2004/0036620 | A1 | | 2/2004 | Herrmann et al. |
| 2005/0012641 | A1 | | 1/2005 | Metz et al. |
| 2007/0103337 | A1 | * | 5/2007 | Heam et al. .................. 340/907 |
| 2008/0080162 | A1 | | 4/2008 | Wilcox et al. |

OTHER PUBLICATIONS

PCT International Search Report, Sep. 30, 2009.

* cited by examiner

*Primary Examiner* — Vibol Tan
(74) *Attorney, Agent, or Firm* — Fay Sharpe, LLP (57) ABSTRACT

In accordance with one aspect of the present exemplary embodiment, an LED lamp is provided. In one embodiment, the LED lamp is made to be mounted in a traffic signal housing that includes other lamps, where the LED lamp can be red, yellow, green or another color and can represent a full ball aspect, an arrow aspect or another aspect. The LED lamp is adapted to be powered by an external power source and includes an input power circuit receiving an input voltage from the external power source. The input power circuit includes a power detection circuit that is adapted to determine a power state of the traffic LED lamp. The LED lamp further includes an LED load and a battery powered driving circuit. The battery power driving circuit drives the LED load if the power state of the LED lamp is in a power failure state.

20 Claims, 6 Drawing Sheets

TRAFFIC LED LAMP WITH INTERNAL CIRCUIT BACKUP SYSTEM

This application claims the benefit of U.S. Provisional Application No. 61/089,072, filed Aug. 15, 2008, incorporated herein by reference in its entirety.

BACKGROUND

The present invention relates generally to traffic control systems, and more particularly to improvements in operating traffic signal lights at controlled roadway intersections during times when loss of electrical power occurs.

Operation of a traffic control system requires a supply of AC power to equipment. When AC power ceases to be supplied, the traffic control system ceases to operate and the traffic signal lights no longer emit light, thereby becoming dark. The result is that drivers of vehicles approaching the signalized intersection do not see any traffic signal lights. The drivers of vehicles approach what is typically referred to in the industry as "a dark intersection." The Manual on Uniform Traffic Control Devices (MUTCD) of the Federal Highway Administration (FHWA), listed in the Federal Register, states that it is acceptable to operate a signalized intersection as "a dark intersection" and that, during such operation, drivers of vehicles are expected to interpret "a dark intersection" the same as they would an intersection having stop signs; stopping their vehicles before proceeding through the intersection. In practice, since it is commonly ignored, some agencies require that police be dispatched to intersections to ensure 4-way stop. As should be appreciated, this is very labor intensive/expensive. Still other agencies require DPW (department of public works) personnel to take temporary stop signs out to intersections when power is out. This is very labor intensive/expensive as well. Not only must personnel place temporary stop signs at intersection, but personnel must remove the temporary stop signs as soon as power comes back on.

One of the purposes of traffic signals is to make intersections more visible, and hence, safer. There has long been need for improvements in making "a dark intersection" more visible to drivers of vehicles for traffic control. Traffic signal lights may be difficult to see even when operating properly and lit. But when traffic signal lights are dark, intersections become very difficult for drivers of vehicles to see. The result is that accidents occur, causing property damage and bodily harm with potential loss of life. Power outages leading to loss of traffic signal light operation are most likely to occur as the result of inclement weather, which causes visibility to be degraded. Thus, the loss of traffic signal operation most commonly occurs when its reliable operation is needed most. Loss of traffic signal light operation during nighttime due to loss of power poses an all-too-common threat to the safety of drivers of vehicles, their passengers and bystanders.

While controller failures have been proposed which initiate an alarm upon detection of a problem, this is often too late and can also be very dangerous. For example, if two or more cars are approaching an intersection from different directions, and the traffic lights suddenly go out, the approaching cars would not know who had the right-of-way and could crash.

Various systems have been proposed for providing computers with back-up power, such as can be provided by a bank of batteries coupled in series and an inverter, such that the traffic signals can continue to operate as normal under a back-up power. Such systems often include battery chargers for charging the bank of batteries to a predetermined float voltage, the float voltage being determined by the sum of the voltages of the batteries. However, if one, or more, of the batteries, or cells thereof, are defective and, hence, effectively a short, the total voltage across the bank of batteries will never reach the float voltage to shutoff the battery charger, resulting in a damaging overcharging of the remaining good batteries.

Further, when the utility power returns, it is necessary for the controller to transparently switch from the backup power to the utility power, i.e., the output of the inverter must be in-phase with the utility power.

Still further, systems often shut down when the line voltage is determined to be too low. However, utility lines often have relatively high impedance, and line conditioners to condition utility power often are highly inductive. The high inductance results in a large inrush of current upon a restart of the controller, and this large inrush current traveling through the high impedance utility line results in a short term voltage drop which can trick the system into shutting down.

Finally, inverters typically include power transistors. To monitor the condition of a load coupled to the inverter, devices have been proposed which monitor the current through the power transistors when conducting. This, however, does not always provide an accurate indication of the condition of the load.

As an alternative to complete back-up power or alarms during power failure, traffic control systems have used a controller unit that energizes load switches that drive the signal lamps through a flash transfer relay. In the event that a power failure should arise, a monitor actuates the relay to transfer the traffic signal loads to a flasher module. When this transfer occurs, the controller unit and load switches are disconnected from causing the traffic signal lights to be turned ON and to be turned OFF.

The flasher module is capable of causing the traffic signal lights to alternate regularly OFF and ON. This is accomplished by the flasher module in such manner that traffic signal lights are flashed ON and OFF. In doing so, drivers of vehicles may see flashing red traffic signal light indications at the intersection, indicating for them to stop before proceeding through the intersection in a safe manner.

A traffic control system is normally considered as consisting of a traffic controller unit for the purpose of providing 24 volt DC input signals to one or more load switches used to turn traffic signal lights ON. A conflict monitor device is used to monitor the presence of proper alternating current field wire voltages supplied to power the traffic signal lights. When improper AC voltages exist, the conflict monitor causes an electromechanical relay to operate, which in turn causes the flash transfer relay to remove traffic signal light power from the load switches and to connect the traffic signal light power to a flasher unit, which causes traffic signal lights to flash ON and OFF.

Back-up power supplies with power storage capability have been used in traffic control systems at signalized intersections to maintain operation of the traffic control system as it would operate from the external AC power source. Use of such back-up power sources has been limited to only a few signalized intersections, due to space limitations and their high cost.

BRIEF DESCRIPTION

In accordance with one aspect of the present invention, an LED lamp powered by an external power source is disclosed. The system includes an input power circuit receiving an input voltage from the external power source. The input power circuit includes a power detection circuit. The power detection circuit is adapted to determine a power state of the LED lamp. The system further includes an LED load and a battery powered driving circuit. The battery power driving circuit drives the LED load if the power state of the LED lamp is in a power failure state.

In accordance with another aspect of the present invention, a self backup system for an LED lamp is disclosed. The LED lamp includes an LED load. The self backup system includes a line detector circuit adapted to generate a measurement of a voltage from a power supply. The self backup system further includes a battery comprising a voltage and a voltage converter circuit adapted to convert the voltage of the battery to a driving voltage. Furthermore, the self backup system includes a flasher circuit adapted to periodically drive the LED load with the driving voltage and a flasher enabling circuit adapted to determine whether to enable the flasher circuit based upon the measurement of the voltage.

In accordance with another aspect of the present invention, a method for providing a safety backup signal in an LED lamp is provided. The LED lamp receives power from an external power source. The method includes detecting a power state of the LED lamp based upon a measurement of an input voltage from the external power source. The method further includes determining whether the power state is in a power failure state and generating the safety backup signal from a backup power source if the power state is in the power failure state. The safety backup signal is periodic. The method further includes providing the safety backup signal to the LED lamp if the power state is in the power failure state.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

According to an exemplary embodiment, a traffic LED (or rail) lamp includes a self backup system that operates the signal in a flashing mode during a power outage. The traffic LED lamp can be installed in each direction of traffic, such as 4-way, to make all traffic stop at the intersection during a power failure. According to another exemplary embodiment, a general lighting lamp, such as a residential LED lamp, includes a self backup system that operates the lamp in a steady state mode during a power outage. The self backup system includes a self backup circuit and a battery. The self backup circuit can include a line detector circuit, a safety circuit, a conflict monitor circuit adapter, a flasher enabling circuit, a voltage converter circuit, a flasher circuit, a battery charging circuit, and a light output regulation circuit. In some embodiments, the self backup system does not enable in an OFF state of the power line because a smart circuit determines the difference between the OFF state and a power failure state.

As will be appreciated in view of the following discussion, the present invention is advantageous in its low price, low required driving voltage, safety, small space requirement, no AC/DC converter requirement, no battery maintenance, and independence of external supply. It is anticipated that a standard battery could provide 6-8 hours of flash mode until AC power supply is restored. For example, an AAA battery or a car battery. In this manner a 6V or even a 3V battery with power boost circuit could be employed.

Figure 1:
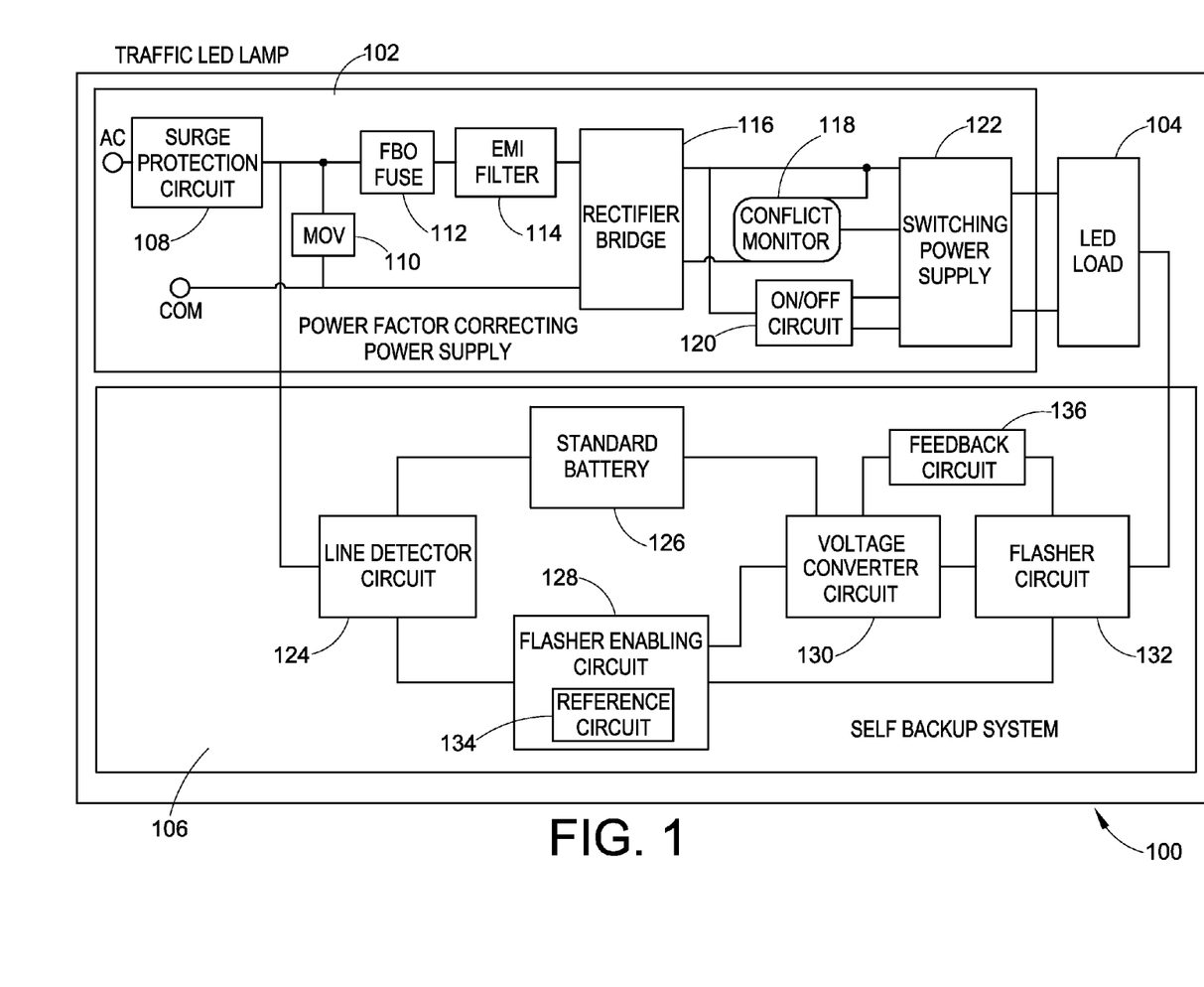
FIG. 1 is a block diagram of the exemplary traffic LED lamp of the present invention.

With reference to FIG. 1, a high level view of an illustrative traffic LED lamp 100 is shown. The traffic LED lamp 100 is comprised of a power factor correcting power supply 102, an LED load 104, and a self backup system 106. The power factor correcting power supply 102 includes a surge protection circuit 108, a metal oxide varistor (MOV) 110, a fuse blow out (FBO) fuse 112, an electromagnetic interference (EMI) filter 114, a rectifier bridge 116, a conflict monitor 118, an on/off circuit 120, and a switching power supply 122. The power factor correcting power supply 102 is what one finds in a traditional traffic LED lamp. The LED load 104 includes one or more LEDs. The self backup system 106 includes a line detector circuit 124, a battery 126, a flasher enabling circuit 128, a voltage converter circuit 130, a flasher circuit 132, and a feedback circuit 136. The flasher enabling circuit 128 includes a reference circuit 134.

Under normal operation the traffic LED lamp 100 receives an input voltage from an external power source. As should be appreciated, even when the traffic LED lamp 100 is in the off state, there will still be a positive input voltage (e.g., 6-7V AC). The input voltage is then fed into a surge protection circuit 108, which is part of the power factor correcting power supply 102. The surge protection circuit 108 acts to isolate the traffic LED lamp 100 from the external power source and, optionally, to transform the input voltage to a DC voltage. Thereafter, the input voltage is distributed to the self backup system 106 and the rest of the power factor correcting power supply 102. The self backup system 106 receives the input voltage via the line detector circuit 124.

The line detector circuit 124 and the flasher enabling circuit 128 enable the flasher circuit 132 only when there is a power failure (i.e., not when traffic LED lamp 100 is OFF or ON). The line detector circuit 124 measures the input voltage and passes a measured voltage to the flasher enabling circuit 128. The flasher enabling circuit 128 compares the measured voltage from the line detector circuit 124 with a reference voltage from the reference circuit 134. As already mentioned, the reference circuit 134 is part of the flasher enabling circuit 128. If the measured voltage from the line detector circuit 124 exceeds the reference voltage from the reference circuit 134, there is power and the flasher circuit 132 should be disabled. Similarly, if the measured voltage from the line detector circuit 124 is less than the reference voltage from the reference circuit 134, there is no power and the flasher circuit 132 should be enabled.

Assuming there is no power (i.e., the flasher circuit 132 should be enabled), the voltage converter circuit 130 and flasher circuit 132 generate a safety backup signal from a backup power source, as described below. This safety backup signal is thereafter provided to the LED load 104.

The voltage converter circuit 130 converts a battery voltage from battery 126 to a level sufficient to drive the LED load 104 (i.e., a drive voltage). The voltage converter circuit 130 is preferably a buck, boost, or buck-boost converter, which allows the voltage converter circuit 130 to regulate a current drawn by the LED load 104. Given the limitations of modern battery technology, limiting the current draw can extend the life of the battery 126 and allow a useful backup time for the LED load 104. A drive voltage generated by the voltage converter circuit 130 is then passed to the flasher circuit 132.

The flasher circuit 132 includes a timer circuit to facilitate flashing. When the flasher enabling circuit 128 and the line detector circuit 124 determine that there is a power failure, the timer circuit is enabled. When the timer circuit is enabled, it pulses at a predetermined frequency, such that the pulses enable the voltage converter circuit 130 to drive the LED load 104. The pulses enable the voltage converter circuit 130 to drive the LED load 104, in part, by way of feedback circuit 136. As should be appreciated, enabling the voltage converter circuit 130 to drive the LED load 104 facilitates flashing of the LED load 104. In alternative embodiments, the flasher circuit 132 can be modified to drive the LED load 104 in a steady state (i.e., the LED load 104 will be driven constantly, and not periodic). Accordingly, the flasher circuit 132 may be more generally referred to as a driving circuit.

Figure 2:
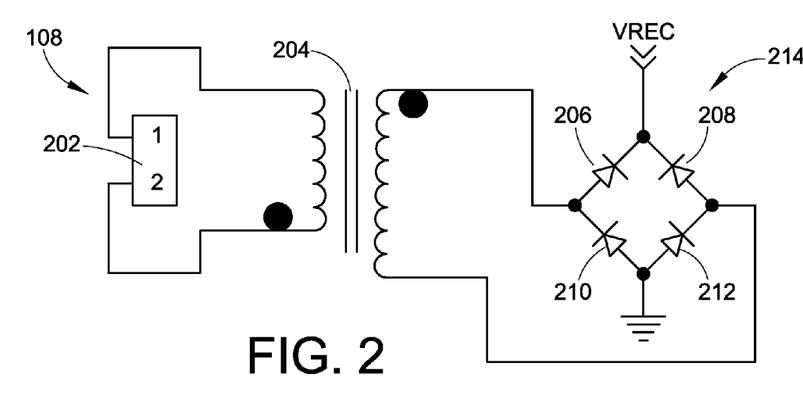
FIG. 2 is circuit schematic of an exemplary embodiment of a surge protection circuit.

With reference to FIG. 2, an exemplary embodiment of the surge protection circuit 108 of FIG. 1 is shown. The surge protection circuit includes a connector 202, a transformer 204, and a plurality of diodes 206, 208, 210, 212. The surge protection circuit 108 receives an input voltage from an external power source. Under normal operation the input voltage will usually be one of 80-135V AC for the ON state and 6-7V AC for the OFF state. When there is a power failure, however, the input voltage will be approximately 0V. The connector 202 connects to the transformer 204, wherein the input voltage is transformed by a predetermined scaling factor (e.g., 4.8).

Thereafter, the transformed voltage is rectified via a bridge rectifier 214 comprised of the plurality of diodes 206, 208, 210, 212. As should be appreciated, if the input voltage is a DC voltage, the bridge rectifier may be excluded from the surge protection circuit 108. However, regardless of the embodiment, a DC voltage is output from the surge protection circuit 108. This voltage is then passed to the line detector circuit 124 of FIG. 1 and the rest of the power factor correcting power supply 102 of FIG. 1.

Figure 3:
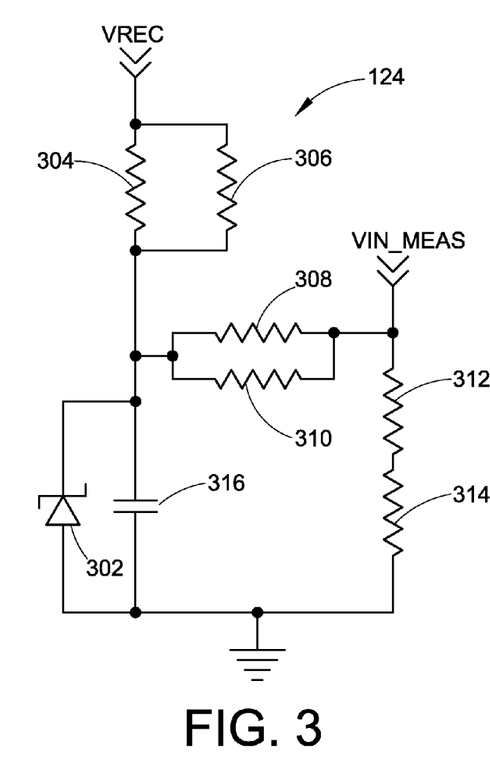
FIG. 3 is circuit schematic of an exemplary embodiment of a line detection circuit.

With reference to FIG. 3, an exemplary embodiment of the line detector circuit 124 of FIG. 1 is illustrated. The line detector circuit includes a zener diode 302, a first plurality of resistors 304, 306, a second plurality of resistors 308, 310, 312, 314, and a capacitor 316. The line detector circuit 124 receives the input voltage from the surge protection circuit. Under one embodiment, the input voltage is transformed to a DC voltage around 24V through 108V. The zener diode 302 is used in conjunction with the first plurality of resistors 304, 306 to protect the flasher enabling circuit, whereby said components limit current draw and prevent the voltage across the capacitor 316 from exceeding a predetermined voltage. Under the preferred embodiment, the voltage across capacitor 316 is prevented from exceeding 13V. Additionally, as should be appreciated, the zener diode 302 will generally scale the input voltage when the traffic LED lamp is in the ON state, but not when the traffic LED lamp is in the OFF state. The capacitor 316 smoothes the voltage across the zener diode 302.

The voltage across capacitor 316 (and the zener diode 302) is then passed to a simple voltage divider comprised of the second plurality of resistors 308, 310, 312, 314. The divided voltage creates a measured voltage. The measured voltage exceeds a predetermined threshold (e.g., 1.24V under one embodiment) when the traffic LED lamp is in the ON state or the OFF state. It should appreciated that the measured voltage when the system is in the ON state (e.g., 13V) will exceed the measured voltage when the system is in the off state (e.g., 2V). Similarly, the measured voltage will be below the predetermined threshold when the traffic LED lamp is without power (e.g., a power failure). The measured voltage is then output to the flasher enabling circuit.

Figure 4:
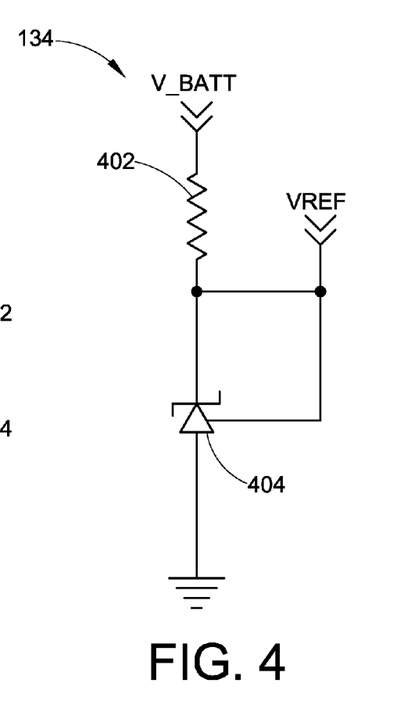
FIG. 4 is a circuit schematic of an exemplary embodiment of a reference circuit.

With reference to FIG. 4, an exemplary embodiment of the reference circuit 134 is illustrated. The reference circuit 134 includes a resistor 402 and a zener shunt regulator 404. As mentioned above, the predetermined threshold is set by the reference circuit 134. The reference circuit 134 is a sub-circuit of the flasher enabling circuit and derives a reference voltage from the battery. In one embodiment, the reference circuit 134 creates a reference voltage of 1.24V. The zener shunt regulator 404, in conjunction with resistor 402, ensures the reference voltage remains stable during varying loads. Additionally, the resistor 402 functions as a current limiting resistor.

Figure 5:
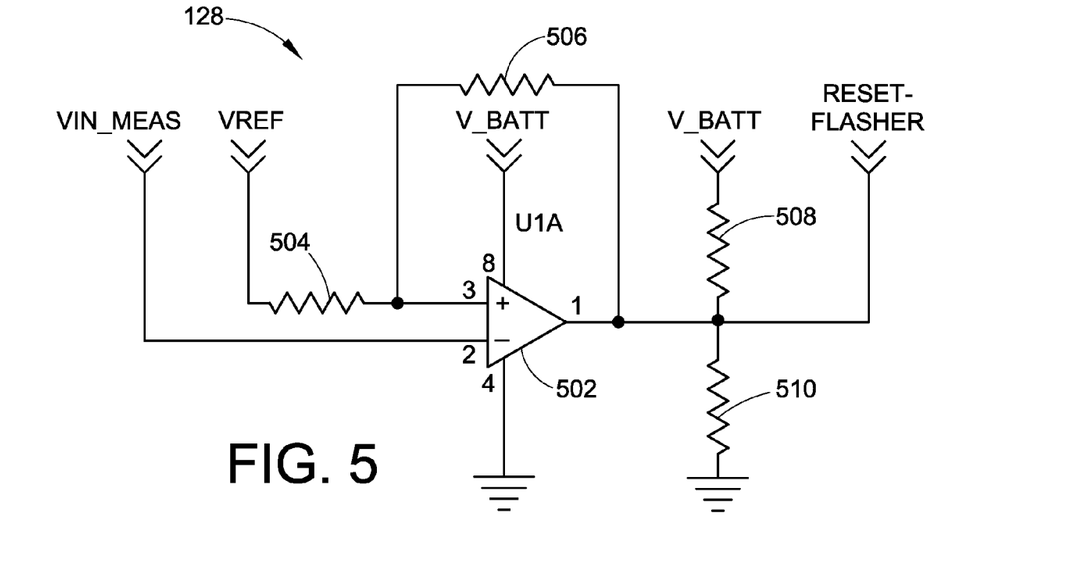
FIG. 5 is a circuit schematic of an exemplary embodiment of a flasher enabling circuit.

With reference to FIG. 5, an exemplary embodiment of the flasher enabling circuit 128 of FIG. 1 is illustrated. The flasher enabling circuit 128 is powered by the battery and includes a comparator 502 and a plurality of resistors 504, 506, 508, 510. The comparator 502 allows the flasher enabling circuit 128 to determine when to reset the flasher circuit. The comparator 502 takes the reference voltage from the reference circuit and compares it against the measured voltage from the line detector circuit. The comparator 502 is configured, for example, as a non-inverting comparator with hysteresis. The plurality of resistors 504, 506, 508, and 510 define the operation of, and amount of hysteresis of, the comparator 502.

When the measured voltage from the line detector circuit is less than the reference voltage, the comparator 502 outputs logic "1" (6V DC under one embodiment). When the measured voltage from the line detector circuit is greater than the reference voltage, the comparator 502 outputs logic "0" (0V DC under one embodiment) Accordingly, as should be appreciated, if the traffic LED lamp is in the ON state or the OFF state (i.e., there is power), logic "0" is returned; otherwise, logic "1" is returned (i.e., there is a power failure). The output of comparator 502 corresponds to a reset voltage, which is passed to the flasher circuit.

Figure 6:
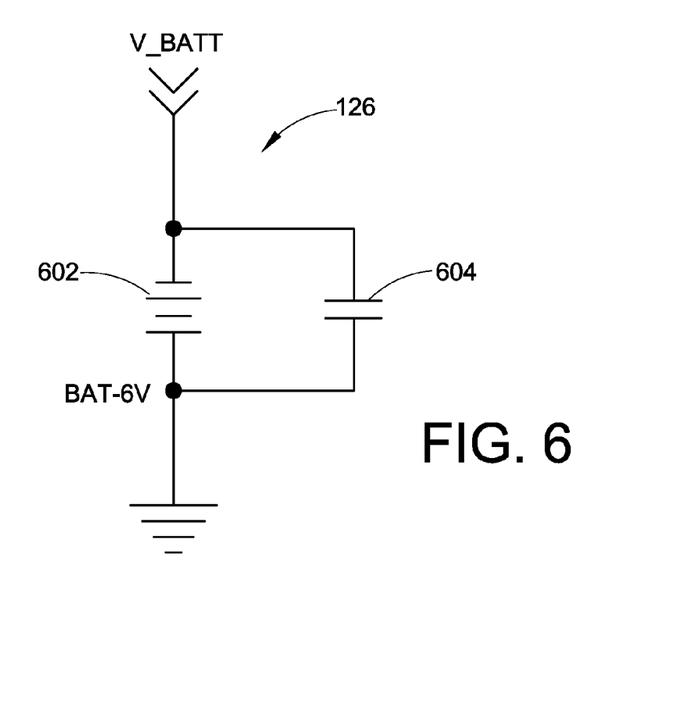
FIG. 6 is a circuit schematic of an exemplary embodiment of a battery.

With reference to FIG. 6, an exemplary embodiment of the battery 126 of FIG. 1 is illustrated. The battery, as shown in FIG. 6, is modeled as a voltage source 602 and a capacitor 604. The capacitor 604 simply serves to model capacitance inherent in the battery 126. The battery 126 powers the voltage converter circuit.

Figure 7:
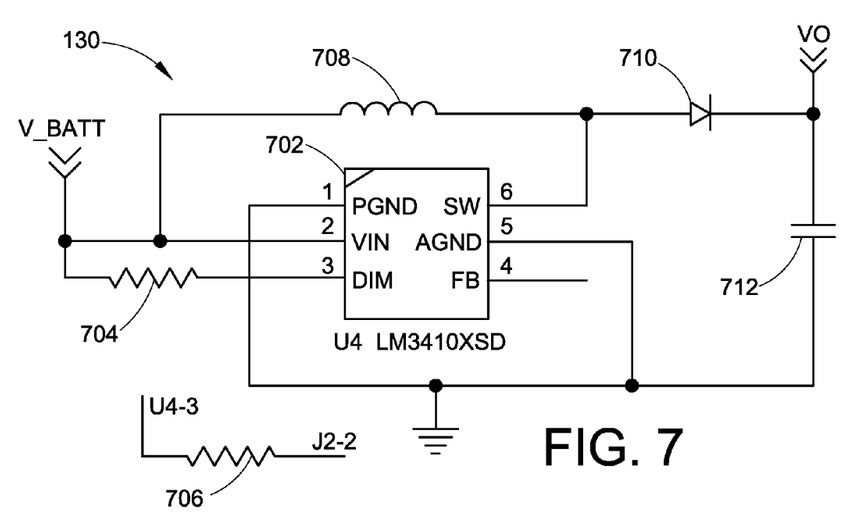
FIG. 7 is a circuit schematic of an exemplary embodiment of a voltage converter circuit.

With reference to FIG. 7, an exemplary embodiment of the voltage converter circuit 130 of FIG. 1 is shown. The voltage converter circuit 130 includes a constant current boost circuit 702, a first resistor 704, a second resistor 706, an inductor 708, a diode 710, and a capacitor 712. As should be appreciated, the voltage converter circuit 130 regulates the current drawn by the LED load and/or converts the battery voltage (6V DC in some embodiments) to a sufficient level to drive the LED load. As illustrated in FIG. 7, the voltage converter circuit 130 is a boost converter provisioned to switch on and off to produce a regulated voltage across the LED load. Alternatively, the voltage converter circuit 130 could be buck or buck-boost converter depending on the LED load.

The constant current boost circuit 702 coordinates switching between an ON state and an OFF state. The inductor 708 stores energy while the switching is in the ON state, and delivers energy to the LED load when the switching is in the OFF state. As should be appreciated, this allows a higher voltage than would otherwise be possible from the battery. The diode 710 isolates the inductor 708 when the switching is in the OFF state. The first resistor 704 is a current limiting resisting enabling the constant current boost circuit 702. In an alternative embodiment, the second resistor 706 may be connected, in place of the first resister 704, between the constant current boost circuit 702 (pin 3) and a connector 822 (pin 2) of FIG. 8 to turn the constant current boost circuit 702 off when the traffic LED lamp has power (i.e., LED lamp is in the ON state or the OFF state). As should be appreciated, this advantageously increases the life time of the battery. The constant current boost circuit 702 also receives a feedback voltage from the feedback circuit to regulate the voltage across the LED load. If the feedback voltage is grounded, the constant current boost circuit 702 is disabled, and no switching occurs. The capacitor 712 is used to remove switching noise and smooth the regulated voltage. Thereafter, the regulated voltage is output to the flashing circuit.

Figure 8:
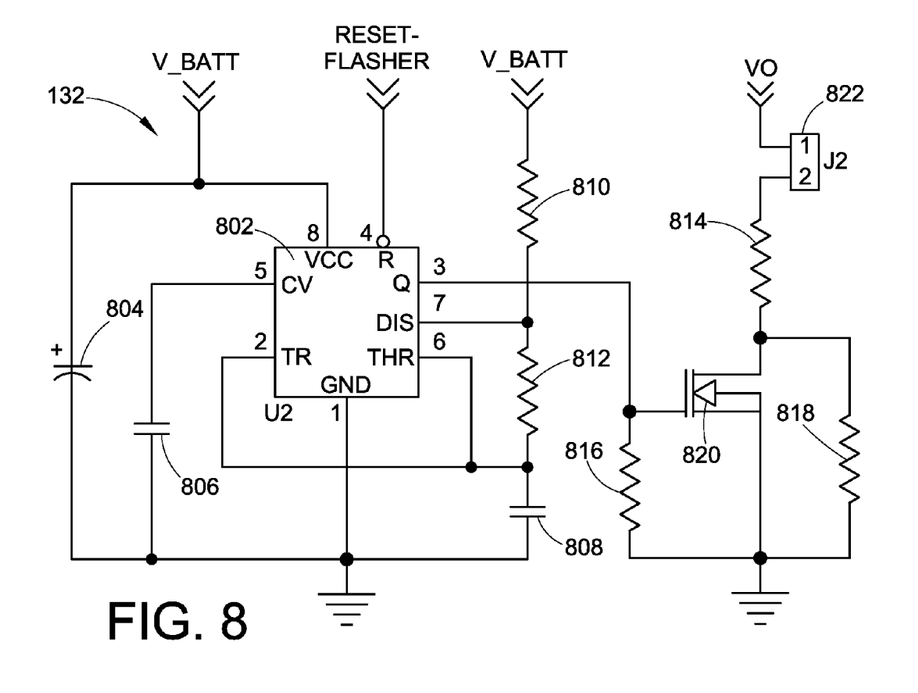
FIG. 8 is a circuit schematic of an exemplary embodiment of a flasher circuit.

With respect to FIG. 8, an exemplary embodiment of the flashing circuit 132 of FIG. 1 is illustrated. The flashing circuit 132 is driven by the battery and includes a timer 802, a capacitor 804, a plurality of capacitors 806, 808, a first resistor 810, a second resistor 812, a third resistor 814, a fourth resistor 816, a fifth resistor 818, a MOSFET 820, and a connector 822. The flashing circuit receives the reset voltage from the flasher enabling circuit, which controls a reset input on the timer 802. Under the preferred embodiment, the reset input of timer 802 is an inverted input, and thus logic "0" from the reset voltage resets the timer 802 (i.e., timer 802 is disabled) and logic "1" from the reset voltage enables the timer 802. As discussed, supra, the reset voltage is only logic "0" when there is power. Otherwise, the reset voltage is logic "1," thereby enabling the timer 802. The capacitor 804 is used to maintain the input voltage to the timer 802.

If the timer 802 is enabled, the timer 802 produces periodic pulses. The first resistors 810 and the second resistor 812, in conjunction with the plurality of capacitors 806, 808, are used to determine the period of the pulses (i.e., how frequent the timer pulses). The pulses from the timer 802 control a gate of the MOSFET 820. During a pulse, the timer 802 turns the MOSFET 820 on, thereby completing the circuit and allowing the regulated voltage from the voltage converter circuit to drive the LED load. The fourth resistor 816 ties the gate of the MOSFET 820 to ground so as to ensure it is never floating (i.e., it is always tied to ground or pulled high). The LED load is connected to the connector 822 whereby the LED load is driven by the voltage converter circuit.

Figure 9:
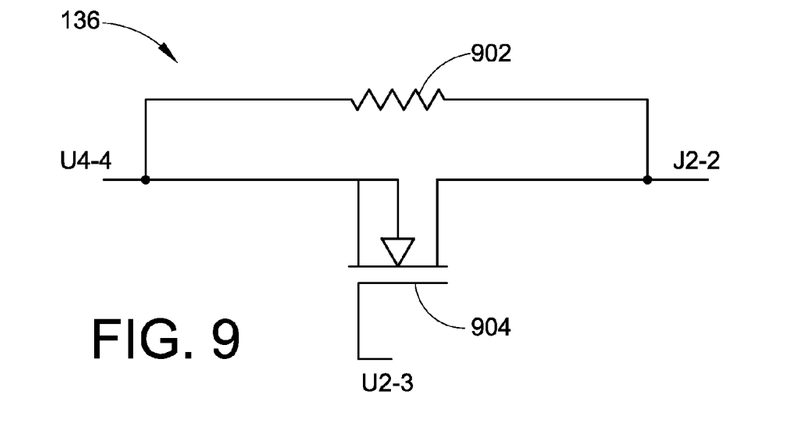
FIG. 9 is a circuit schematic of an exemplary embodiment of a feedback circuit.

With reference to FIG. 9, an exemplary embodiment of the feedback circuit 136 of FIG. 1 is illustrated. The feedback circuit 136 includes a resistor 902 and a MOSFET 904. The voltage at pin 2 of the connector 822 of FIG. 8 (i.e., the summation of the voltages across the third resistor 814 and the fifth resistor 818 of FIG. 8) corresponds to the feedback voltage to be applied to the voltage converter circuit. The timer 802 of FIG. 8 controls the gate of the MOSFET 904. During a pulse of the timer, the MOSFET 904 completes a feedback path to the voltage converter by connecting the feedback voltage to the voltage converter circuit. The feedback voltage enables the voltage converter circuit and allows the constant current boost circuit of the voltage converter circuit to maintain the regulated voltage. It should be appreciated that the third resistor 814 of FIG. 8 can be varied to control the voltage across the LED load. Additionally, in an alternative embodiment, the fifth resistor 818 of FIG. 8 and resistor 902 may be added to disable the use of the MOSFET 820 of FIG. 8 and the MOSFET 904. In such an embodiment, the flasher circuit will be disabled and the LED load will be permanently driven (i.e., an emergency lamp application). Hence, the flasher circuit may more generally be referred to as a driving circuit.

Figure 10:
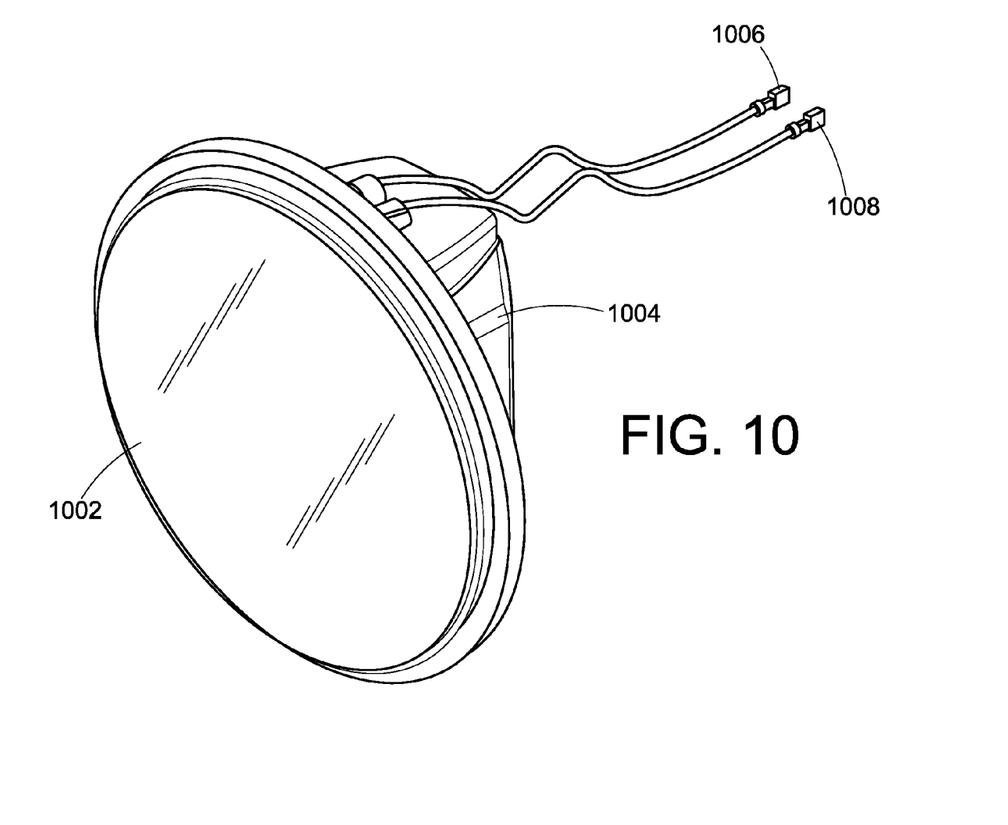
FIG. 10 is a perspective view of a traffic LED lamp.

With reference to FIG. 10, a perspective view of one exemplary embodiment of the traffic LED lamp 100 of FIG. 1 is illustrated. The traffic LED lamp 100 includes, as mentioned above, a power factor correcting power supply (not shown), a self backup system (not shown), and an LED load 1002. The traffic LED lamp 100 further includes a housing 1004 and a plurality of connectors 1006, 1008. As should be appreciated, the power factor correcting power supply and the self backup system are disposed within the housing 1004. The plurality of power connectors 1006, 1008 connect the traffic LED lamp 100 to an external power source. During normal operation, the traffic LED lamp 100 is driven by the external power source. However, in the event of power failure, the traffic LED lamp 100 is driven by the self backup system. For example, when the power fails, the self backup system will be enabled thereby flashing the LED load 1002 (preferably red in color) and warning people of an n-way stop.

Figure 11:
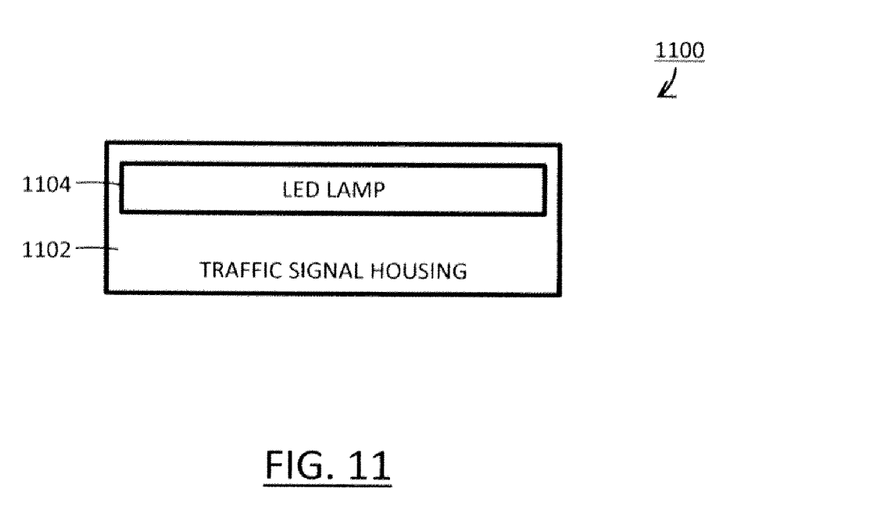
FIG. 11 is a block diagram of a traffic signal assembly including a traffic signal housing and a LED lamp.

With reference to FIG. 11, a block diagram of a traffic signal assembly 1100 is illustrated. The traffic signal assembly 1100 includes a traffic signal housing 1102 and a LED lamp 1104, such as the LED lamp 100 of FIG. 1. The LED lamp 1104 is removably mounted to the traffic signal housing 1102.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A traffic signal assembly powered by an external power source, said assembly comprising:
    a traffic signal housing;
    an input power circuit receiving an input voltage from the external power source, wherein the input power circuit includes a power detection circuit that is adapted to determine a power state of the assembly;
    an LED load;
    a battery powered driving circuit, wherein said battery power driving circuit drives the LED load if the power state of the assembly is in a power failure state; and,
    an LED lamp housing removably mounted to the traffic signal housing, wherein the input power circuit, the LED load and the battery powered driving circuit are disposed within the LED lamp housing.

2. The assembly of claim 1, wherein the battery powered driving circuit comprises a flasher circuit operative to periodically drive the LED load.

3. The assembly of claim 1, wherein a battery associated with the battery powered driving circuit is inside the housing.

4. The assembly of claim 1, wherein a battery associated with the battery powered driving circuit is external to the housing.

5. The assembly of claim 1, further including a battery charging circuit.

6. The assembly of claim 1, wherein the power detection circuit determines the power state by generating a measurement of the input voltage.

7. The assembly of claim 6, wherein the power detection circuit determines the power state by further comparing the measurement of the input voltage against a reference threshold.

8. The assembly of claim 6, wherein the measurement of the input voltage exceeds a first predetermined threshold when the power state of the assembly is in an on state or an off state.

9. The assembly of claim 8, wherein the measurement of the input voltage exceeds a second predetermined threshold when the power state of the assembly is in the on state, but not when the assembly is in the off state.

10. The assembly of claim 8, wherein the measurement of the input voltage is less than the first predetermined threshold when the power state of the assembly in the power failure state.

11. The assembly of claim 1, wherein the LED load is driven by the external power source when the assembly is in an on state, wherein the LED load is not driven when the assembly is in an off state.

12. The assembly of claim 1, wherein the power state of the assembly is one of an on state, an off state, or the power failure state.

13. A traffic signal assembly powered by an external power source, said assembly comprising:
a traffic signal housing;
a line detector circuit adapted to generate a measurement of a voltage from a power supply, the line detector circuit imposing an upper bound on the measurement;
a battery comprising a voltage;
a voltage converter circuit adapted to convert the voltage of the battery to a driving voltage;
a flasher circuit adapted to periodically drive the LED load with the driving voltage;
a flasher enabling circuit adapted to determine whether to enable the flasher circuit based upon the measurement of the voltage; and,
an LED lamp housing removably mounted to the traffic signal housing, wherein the input power circuit, the LED load and the battery powered driving circuit are disposed within the LED lamp housing.

14. The assembly of claim 13, wherein the measurement of the voltage exceeds a first predetermined threshold when the assembly is in an on state or an off state.

15. The assembly of claim 14, wherein the measurement of the voltage exceeds a second predetermined threshold when the assembly is in the on state, but not when the assembly is in the off state.

16. The assembly of claim 14, wherein the measurement of the voltage is less than the first predetermined threshold when the assembly in a power failure state.

17. The assembly claim 13, wherein the flasher enabling circuit compares the measurement of the voltage against a reference threshold.

18. A method for providing a safety backup signal in an LED lamp, wherein said LED lamp receives power from an external power source, said method comprising:
detecting a power state of the LED lamp based upon a measurement of an input voltage from the external power source;
determining whether the power state is in a power failure state;
generating the safety backup signal from a backup power source if the power state is in the power failure state, wherein the safety backup signal is periodic; and,
providing the safety backup signal to the LED lamp if the power state is in the power failure state;
wherein said detecting procedure is operative to distinguish between an on state, an off state and the power failure state, said detecting procedure comprising:
scaling the input voltage, wherein the scaled voltage is the minimum of a first predetermined threshold and the input voltage; and
comparing the scaled voltage with a second predetermined threshold to determine the power state.

19. The assembly according to claim 1, wherein said determining is operative to distinguish between an on state, an off state and the power failure state, said determining comprising:
scaling the input voltage, wherein the scaled voltage is the minimum of a first predetermined threshold and the input voltage; and
comparing the scaled voltage with a second predetermined threshold to determine the power state.

20. The assembly according to claim 13, wherein the line detector circuit imposes the upper bound on the measurement using a zener diode.

* * * * *